June 6, 1950 E. F. BLACKWELDER ET AL 2,510,458
ROW CROP BLOCKING IMPLEMENT
Filed June 15, 1946 2 Sheets-Sheet 1

INVENTORS
E. F. Blackwelder,
H. V. Lea & J. A. Fleig
BY
ATTORNEYS

June 6, 1950 E. F. BLACKWELDER ET AL 2,510,458
ROW CROP BLOCKING IMPLEMENT
Filed June 15, 1946 2 Sheets-Sheet 2
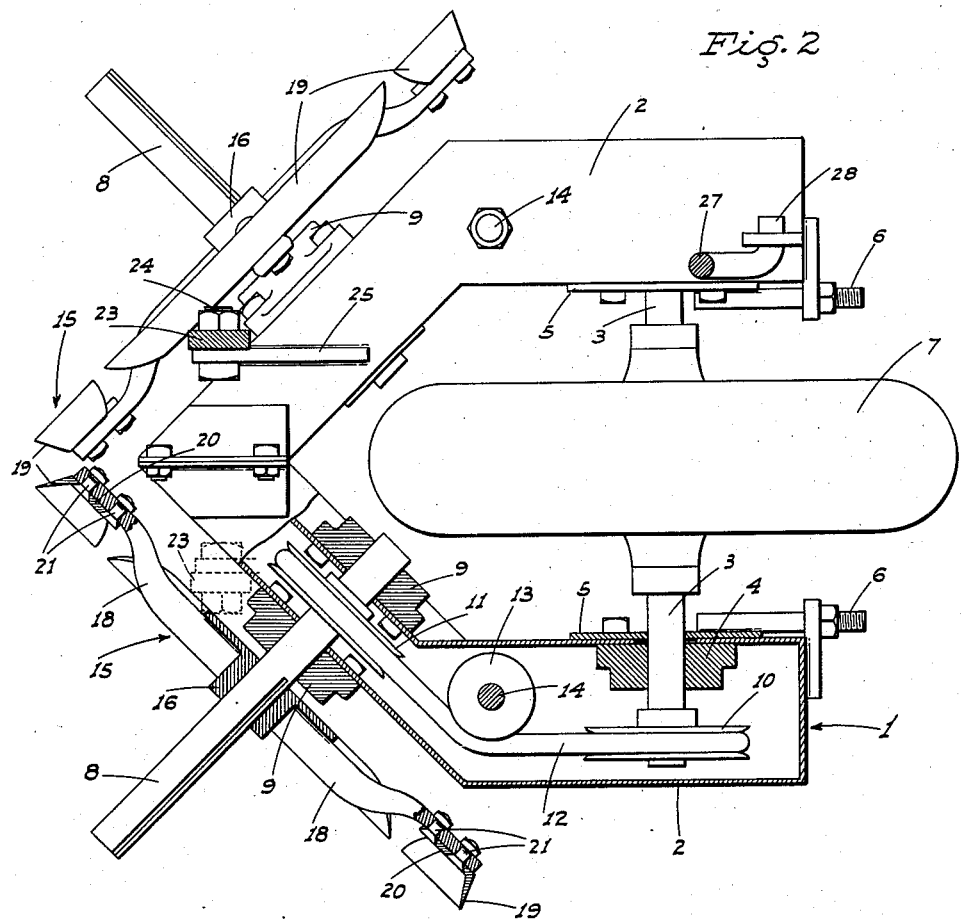
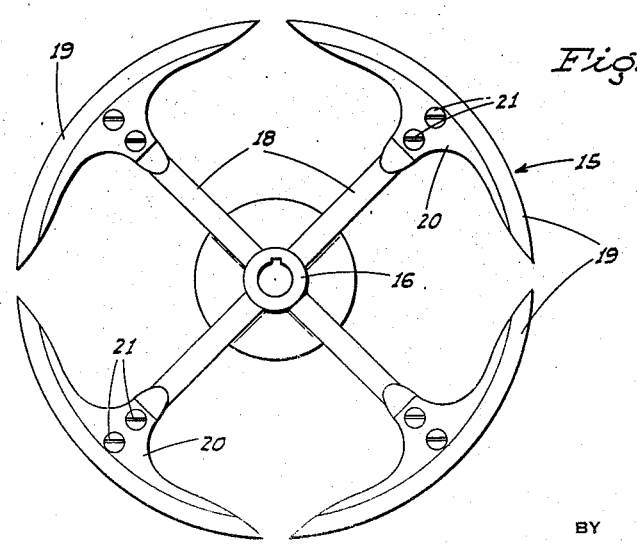
INVENTORS
E. F. Blackwelder,
H. V. Lea & J. A. Fleig
BY
ATTORNEYS Patented June 6, 1950

2,510,458

UNITED STATES PATENT OFFICE 2,510,458

ROW CROP BLOCKING IMPLEMENT

Ernest F. Blackwelder, Henry V. Léa, and John A. Fleig, Rio Vista, Calif.

Application June 15, 1946, Serial No. 677,076

1 Claim. (Cl. 97—16)

This invention relates in general to agricultural equipment, and an object of the invention is to provide an improved row crop blocking implement; such implement being operative, upon passage along crop rows, to effectively and recurringly block or chop out unnecessary plants in the rows at evenly spaced points, and for a predetermined distance at each such blocking point.

Another object of the invention is to provide a row crop blocking implement designed for mounting in connection with conventional wheel tractors; the implement including a ground engaging wheel which serves to drive the rotary choppers at a speed proportionate to ground speed of the tractor, and also to gauge the extent of penetration of said rotary choppers into the ground.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Fig. 2 is a top plan view of the implement, partly in section.

Fig. 3 is a front elevation of one of the rotary choppers, detached.

Figure 1:
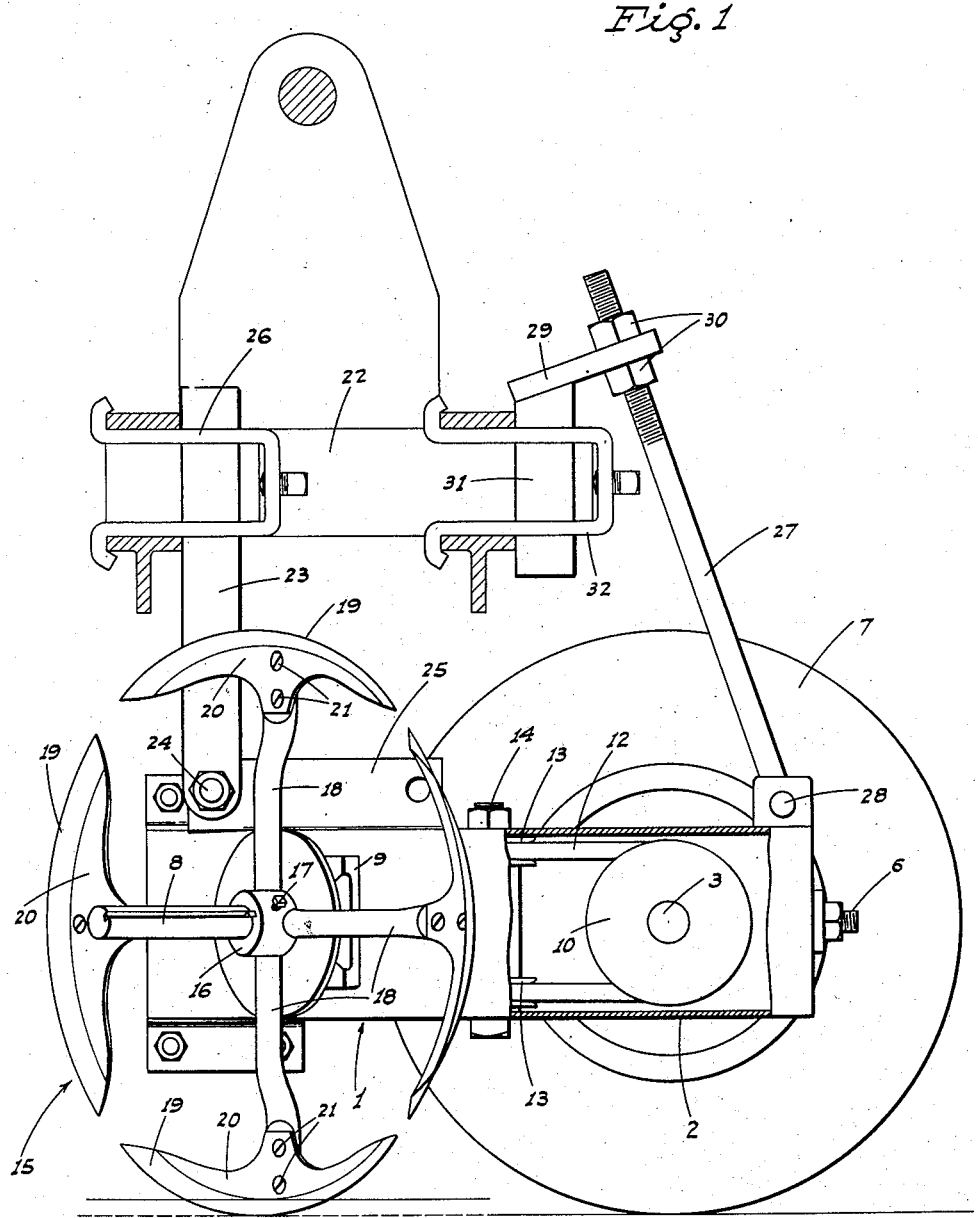
Fig. 1 is a side elevation of the implement, with the near side of the hollow frame partly broken away to expose the adjacent drive pulley arrangement.

Referring now more particularly to the characters of reference on the drawings, the improved, row crop blocking implement comprises a hollow frame 1 which is generally V-shaped in plan, and adapted to be disposed in a substantially horizontal position, with the pointed end foremost and open at the rear. Such hollow frame includes parallel rear legs 2 disposed in relatively widely spaced apart relation.

A horizontal, transversely extending axle 3 is mounted between the legs 2 of the hollow frame 1 and is carried, at opposite ends, within said legs, by bearings 4. The bearings 4 are affixed to slide blocks 5, which in turn are secured to longitudinally extending adjustment bolt units 6, by means of which the position of the bearings 4 may be adjusted lengthwise of the implement, for the reason which will hereinafter appear.

Centrally between the legs 2 of the frame 1 the implement includes a pneumatic-tired wheel 7 fixed on the axle 3.

A pair of substantially horizontal shafts 8 are mounted in connection with the frame 1 on the forward portion thereof and equally spaced on opposite sides of the longitudinal center line of said frame; the shafts 8 each projecting forwardly in divergent relation at approximately a 45° angle to said center line. The shafts 8 are supported on the frame by spaced bearings 9.

Each shaft 8 is separately driven from the axle 3 by the following drive mechanism:

A V-pulley 10 is mounted on the axle 3 in the corresponding leg 2 of the frame, and another V-pulley 11 is mounted on the shaft 8 between the bearings 9. An endless belt 12 runs between the V-pulleys 10 and 11, and intermediate said pulleys passes about vertically spaced idler and direction-changing pulleys 13 mounted on a vertical spindle 14 in the forward end portion of the adjacent leg 2. The corresponding adjustment bolt unit 6 is employed for the purpose of maintaining proper tension on the belt 12.

The shafts 8 are fitted with rotary plant choppers or blockers indicated generally at 15, each of which rotary choppers comprises a hub 16 slidably keyed on its shaft 8, but normally held in a selected position of adjustment therealong by a set screw 17. Arms 18 radiate from the hub 16 in equally spaced, circumferential relation, and in the present embodiment there are four of such arms.

At their outer ends the arms 18 support segmental, arcuate cutting or chopper blades 19 of equal length, concentric to the hub, and spaced apart at adjacent ends. The blades 19 are formed, along their trailing edges, with inturned attachment flanges 20 which are rigidly but removably secured to the outer ends of the arms 18 by screws 21, whereby the blades 19 may be readily removed for replacement or repair.

The frame 1 is adapted to be suspended from a vertically adjustable tool bar assembly of a tractor, which tool bar assembly is indicated generally at 22, by means of the following arrangement:

Adjacent the forward end of the frame 1, but on opposite sides of its longitudinal center line, said frame is fitted with a pair of standards 23 transversely pivotally connected, as at 24, with upstanding flanges 25. The upper end portions of the standards 23 are secured to the tool bar assembly 22 of the tractor, by means of clamps 26.

A gauge rod 27 is pivotally connected with the frame 1 at the rear end of one of the legs 2, as at 28, and thence extends at an upward and forward incline to adjacent the tool bar assembly 22. At its upper end the gauge rod 27 is threaded for axial adjustment and projects through a bracket 29; axial adjustment of said rod being accomplished through the medium of nuts 30 threaded on the rod and abutting the bracket 29 on opposite faces. A short post 31 is formed rigid with the bracket 29 and depends therefrom, said post being secured to the tool bar assembly 22 by a clamp 32.

By reason of the above described arrangement of the standards 23 and gauge rod 27, the row crop blocking implement is effectively suspended, in rigid relation, below the tool bar assembly 22. The extent to which the rotary choppers 15 penetrate or run in the ground is controlled by adjustment of said gauge rod 27. The blocks may be adjustably positioned along the shafts 8 by loosening the set screws 17, sliding the hubs 15 along the shafts to the selected position and then again tightening the set screws.

The tool bar assembly 22 is of the type which is vertically adjustably mounted on a wheel tractor between the front and rear wheels thereof, whereby the row crop blocking implement is suspended, under the tractor, for operation.

When the implement is in use, the wheel 7 runs between adjacent crop rows, while the rotary choppers 15 are adjusted on the shafts 8 to transversely space said choppers to work directly along said adjacent rows from above.

With advance of the tractor the wheel 7 is rotated by virtue of its engagement with the ground and such rotation is imparted through the axle 3 and the described endless belt and pulley units to the shafts 8, which shafts thus simultaneously rotate the rotary choppers 15.

As the tractor advances, and with rotation of the choppers 15 which are set to run in the ground to a certain depth, the blades 19 each block out a portion of the crop row proportionate in length to the circumferential extent of said blade; each blocked-out portion of the crop row being followed by an unblocked portion proportionate in length to the space between adjacent ends of said blades. It will be evident that the length of each blocked-out portion, and the intervening unblocked portion, of a crop row can be regulated by varying the proportionate arcuate extent of the blades 19 and the spacing between adjacent ends of the latter. Also, the number of blocked and unblocked portions of the crop row, per revolution of each rotary chopper, can be varied by employing more or less of the blades.

With this improved row crop blocking implement effective work can be performed accurately and readily; the implement being practical, simple and compact in structure, and requires a minimum of servicing or repair.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A suspension means for an implement which includes a rigid frame which is wheel mounted at its rear end and projects forwardly therefrom with a ground working instrumentality on such forward end of the frame, such suspension means including in combination: a tool bar suspended from a tractor, a vertically disposed standard, means pivotally connecting the lower end of the standard to the forward end of the frame, means rigidly fixing the upper end of the standard to the tool bar, a gauge rod, means pivotally connecting the lower end of the gauge rod to the rear end of the frame, and means adjustably connecting the upper end of the gauge rod in rigid relation on the tool bar; said last named means including a short vertical post, means to clamp the post to the tool bar, a bracket projecting outwardly from the post, the outer end of the gauge bar being threaded, such threaded end projecting through the bracket, and a nut on such threaded end on each side of the bracket.

ERNEST F. BLACKWELDER.
HENRY V. LÉA.
JOHN A. FLEIG.

REFERENCES CITED

The following references are of record in the file of this patent:

UNITED STATES PATENTS

| Number | Name | Date |
|--------|------|------|
| 338,130 | Ziegler et al. | Mar. 16, 1886 |
| 369,364 | Putnam | Sept. 6, 1887 |
| 461,931 | Poole | Oct. 27, 1891 |
| 593,908 | Richter | Nov. 16, 1897 |
| 1,355,737 | Dale | Oct. 12, 1920 |
| 1,674,551 | Hutchins | June 19, 1928 |
| 1,804,412 | Glasier | May 12, 1931 |
| 1,884,246 | Ridderstrom | Oct. 25, 1932 |
| 2,373,716 | Soucie | Apr. 17, 1945 |
| 2,414,507 | Callahan | Jan. 21, 1947 |
| 2,417,931 | Hipple | Mar. 25, 1947 |

FOREIGN PATENTS

| Number | Country | Date |
|--------|---------|------|
| 536,741 | Great Britain | May 26, 1941 |